(12) United States Patent
Maruyama

(10) Patent No.: US 8,976,809 B2
(45) Date of Patent: Mar. 10, 2015

(54) COMMUNICATION SYSTEM, MONITORING DEVICE OF RING NETWORK, AND FLOW RATE MONITORING METHOD OF RING NETWORK

(71) Applicant: Fujitsu Telecom Networks Limited, Kawasaki-shi (JP)

(72) Inventor: Ryo Maruyama, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 143 days.

(21) Appl. No.: 13/734,646

(22) Filed: Jan. 4, 2013

(65) Prior Publication Data

US 2013/0182591 A1 Jul. 18, 2013

(30) Foreign Application Priority Data

Jan. 16, 2012 (JP) .................................. 2012-005838

(51) Int. Cl.
*H04J 3/16* (2006.01)
*H04L 12/26* (2006.01)

(52) U.S. Cl.
CPC .................................. *H04L 43/0894* (2013.01)
USPC .............................. 370/466; 370/232; 370/252

(58) Field of Classification Search
None
See application file for complete search history.

(56) References Cited

U.S. PATENT DOCUMENTS

| 5,023,871 A * | 6/1991 | Nakayashiki et al. ........ 370/455 |
| 7,573,898 B2 * | 8/2009 | Burrell et al. ................. 370/463 |
| 2013/0182591 A1 * | 7/2013 | Maruyama ..................... 370/252 |

FOREIGN PATENT DOCUMENTS

JP 2009-284406 A 12/2009

* cited by examiner

*Primary Examiner* — Robert Wilson
(74) *Attorney, Agent, or Firm* — Ladas & Parry, LLP

(57) ABSTRACT

A communication system includes a plurality of communication devices forming a ring network and a monitoring device. Each of the plurality of communication devices appends, to a frame that the communication device relays, an ID tag indicating the number of communication devices relaying that frame in the ring network. The monitoring device refers to frames received by a predetermined communication device and having the ID appended thereto, and tallies an amount of data for frames for each number of relaying communication devices.

7 Claims, 18 Drawing Sheets

COMMUNICATION SYSTEM 100

FIG.11

| COMMUNI-CATION DEVICE | DIRECTION | PASSAGE ID | | | | BLOCK POINT |
|---|---|---|---|---|---|---|
| | | 1 | 2 | 3 | 4 | |
| 10a | L | 50 | 0 | 300 | 100 | B |
| | R | 0 | 0 | 0 | 0 | |
| 10b | L | 0 | 0 | 0 | 0 | |
| | R | 0 | 0 | 200 | 100 | |
| 10c | L | 0 | 0 | 0 | 0 | |
| | R | 0 | 0 | 300 | 0 | |
| 10d | L | 0 | 0 | 0 | 0 | |
| | R | 0 | 0 | 0 | 0 | |
| 10e | L | 0 | 0 | 200 | 0 | |
| | R | 50 | 0 | 0 | 0 | |

FIG.12

| COMMUNI-CATION DEVICE | DIRECTION | PASSAGE ID | | | | BLOCK POINT |
|---|---|---|---|---|---|---|
| | | 1 | 2 | 3 | 4 | |
| 10a | L | 50 | 0 | 300 | 100 | |
| | R | 0 | 0 | 0 | 0 | B(OLD) |
| 10b | L | 0 | 0 | 0 | 0 | |
| | R | 0 | 0 | 200 | 100 | B(NEW) |
| 10c | L | 0 | 0 | 0 | 0 | |
| | R | 0 | 0 | 300 | 0 | |
| 10d | L | 0 | 0 | 0 | 0 | |
| | R | 0 | 0 | 0 | 0 | |
| 10e | L | 0 | 0 | 200 | 0 | |
| | R | 50 | 0 | 0 | 0 | |

FIG.13

| INITIAL DIRECTION | INITIAL PASSAGE ID | DIRECTION AT DESTINATION OF TRANSITION | PASSAGE ID AT DESTINATION OF TRANSITION |
|---|---|---|---|
| L | 1 | R | 4 |
| L | 2 | R | 3 |
| L | 3 | R | 2 |
| L | 4 | R | 1 |
| R | 1 | L | 4 |
| R | 2 | L | 3 |
| R | 3 | L | 2 |
| R | 4 | L | 1 |

| COMMUNI-CATION DEVICE | DIRECTION | PASSAGE ID | | | | BLOCK POINT |
|---|---|---|---|---|---|---|
| | | 1 | 2 | 3 | 4 | |
| 10a | L | 50 | 0 | 300 | 0 | B(OLD) |
| | R | 100 | 0 | 0 | 0 | |
| 10b | L | 100 | 200 | 0 | 0 | B(NEW) |
| | R | 0 | 0 | 0 | 0 | |
| 10c | L | 0 | 0 | 0 | 0 | |
| | R | 0 | 0 | 300 | 0 | |
| 10d | L | 0 | 0 | 0 | 0 | |
| | R | 0 | 0 | 0 | 0 | |
| 10e | L | 0 | 0 | 0 | 0 | |
| | R | 50 | 200 | 0 | 0 | |

FIG.16

| COMMUNI-CATION DEVICE | DIRECTION | PASSAGE ID | | | | BLOCK POINT |
|---|---|---|---|---|---|---|
| | | 1 | 2 | 3 | 4 | |
| 10a | L | 50 | 0 | 300 | 100 | B (OLD) |
| | R | 0 | 0 | 0 | 0 | |
| 10b | L | 0 | 0 | 0 | 0 | |
| | R | 0 | 0 | 200 | 100 | |
| 10c | L | 0 | 0 | 0 | 0 | B (NEW) |
| | R | 0 | 0 | 300 | 0 | |
| 10d | L | 0 | 0 | 0 | 0 | |
| | R | 0 | 0 | 0 | 0 | |
| 10e | L | 0 | 0 | 200 | 0 | |
| | R | 50 | 0 | 0 | 0 | |

FIG.17

| COMMUNI-CATION DEVICE | DIRECTION | PASSAGE ID | | | | BLOCK POINT |
|---|---|---|---|---|---|---|
| | | 1 | 2 | 3 | 4 | |
| 10a | L | 50 | 0 | 0 | 0 | |
| | R | 100 | 300 | 0 | 0 | B(OLD) |
| 10b | L | 100 | 200 | 0 | 0 | |
| | R | 0 | 0 | 0 | 0 | |
| 10c | L | 0 | 300 | 0 | 0 | |
| | R | 0 | 0 | 0 | 0 | B(NEW) |
| 10d | L | 0 | 0 | 0 | 0 | |
| | R | 0 | 0 | 0 | 0 | |
| 10e | L | 0 | 0 | 0 | 0 | |
| | R | 50 | 200 | 0 | 0 | |

COMMUNICATION SYSTEM, MONITORING DEVICE OF RING NETWORK, AND FLOW RATE MONITORING METHOD OF RING NETWORK

CROSS-REFERENCE TO RELATED APPLICATIONS

This application claims priority to Japanese Patent Application No. 2012-005838 filed on Jan. 16, 2012, the disclosure of which is hereby incorporated by reference in its entirety.

BACKGROUND OF THE INVENTION

1. Field of the Invention

The present invention relates to a data communication technology and, more particularly, to a communication system, a monitoring device for a ring network, and a flow rate monitoring method for a ring network.

2. Description of the Related Art

To improve the reliability of a communication network, a plurality of communication devices forming a communication network may be connected in a ring pattern (ring topology) so as to provide physically redundant routes. One problem with a ring network is that, when a data frame loops in the ring network, normal communication in the ring network will be difficult to perform. This addressed by applying a protocol for ring control to define a particular communication port in a particular communication device as a block point so that the route for relaying frames between a given set of communication devices is uniquely defined, by blocking data frames relayed via the communication port defined as a block point.

The communication devices in a ring network exchange a special-purpose monitor frame aside from user data between each other. In the event that a circuit failure occurs in any of the devices, the block point hitherto established is opened and communication is continued via a route without a failure.

[patent document 1] JP2009-284406

The flow rate of user data flowing in a ring network varies depending on the time zone, day of the week, etc. Therefore, it has not been easy to determine the optimal position of a block point adapted to the flow rate of user data in a ring network.

SUMMARY OF THE INVENTION

The present invention addresses the problem and a purpose thereof is to provide a technology for facilitating establishment of a block point at a proper position in a ring network.

The communication system addressing the challenge comprises: a plurality of communication devices forming a ring network; and a monitoring device for the ring network. Each of the plurality of communication devices comprises: a relaying unit configured to relay a frame; and an ID processing unit configured to append, to a frame that the communication device relays, an ID indicating the number of communication devices relaying that frame in the ring network, The monitoring device includes a tallying unit configured to refer to frames received by a predetermined communication device forming the ring network and having the ID appended thereto, and to tally an amount of data for the frames for each number of relaying communication devices.

Another embodiment of the present invention relates to a monitoring device for a ring network. The device comprises: an acquisition unit configured to acquire information on an ID that is appended to a frame received by a predetermined one of a plurality of communication devices forming the ring network and that indicates the number of communication devices relaying the frame in the ring network, and to acquire information on an amount of data for the frame; and a tallying unit configured to refer to frames received by the predetermined communication device and to tally an amount of data for frames for each number of relaying communication devices.

Another embodiment of the present invention relates to a flow rate monitoring method for a ring network. The method comprises appending, to a frame relayed by a communication device forming the ring network, an ID indicating the number of communication devices relaying the frame in the ring network; and referring to frames received by a predetermined communication device in the ring network and having the ID appended thereto, and tallying an amount of data for the frames for each number of relaying communication devices.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11 shows the result of tallying by the tallying unit;

FIG. 12 shows a step performed in the estimation process by the estimation unit;

FIG. 13 shows the mapping stored by the transition information storage unit;

FIG. 14 shows the result of estimation by the estimation unit;

FIG. 16 shows a step performed in the estimation process by the estimation unit;

FIG. 17 shows the result of estimation by the estimation unit; and

DETAILED DESCRIPTION OF THE INVENTION

The invention will now be described by reference to the preferred embodiments. This does not intend to limit the scope of the present invention, but to exemplify the invention.

Figure 1:
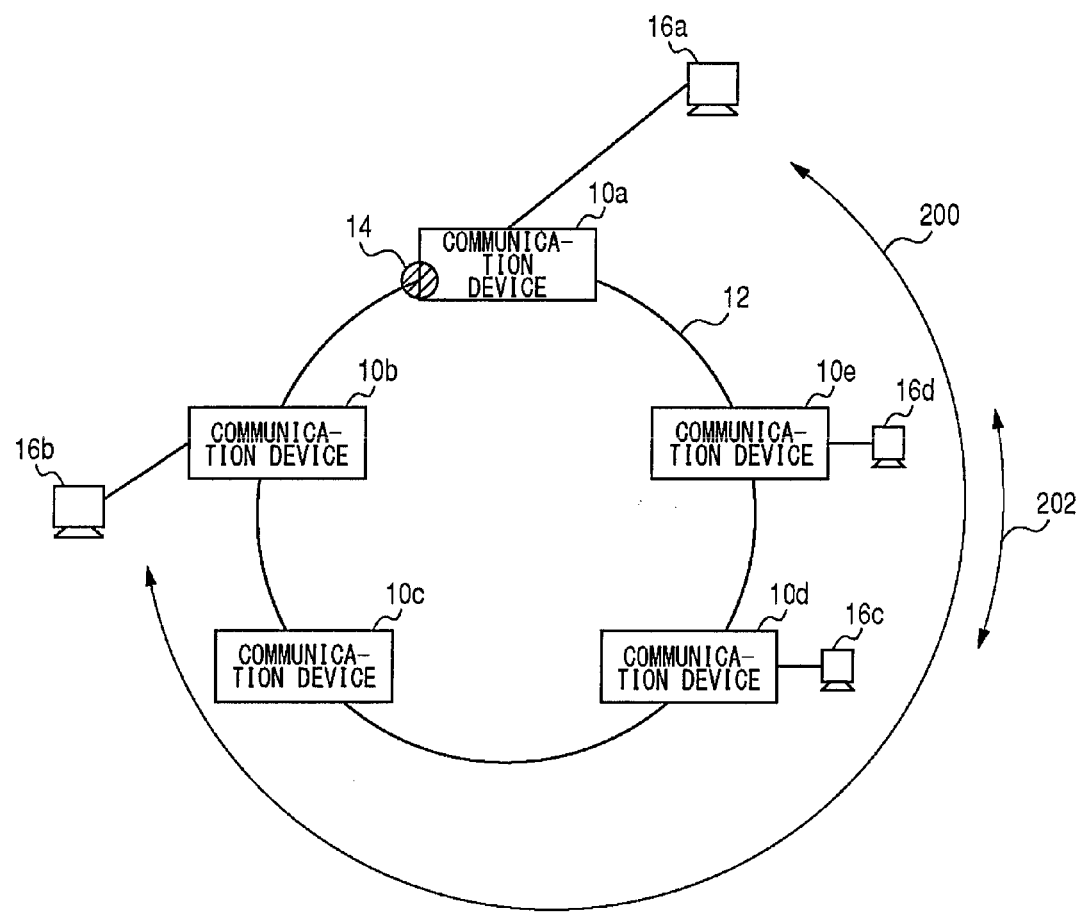
FIG. 1 schematically shows transmission of user data in a ring network.
Figure 2:
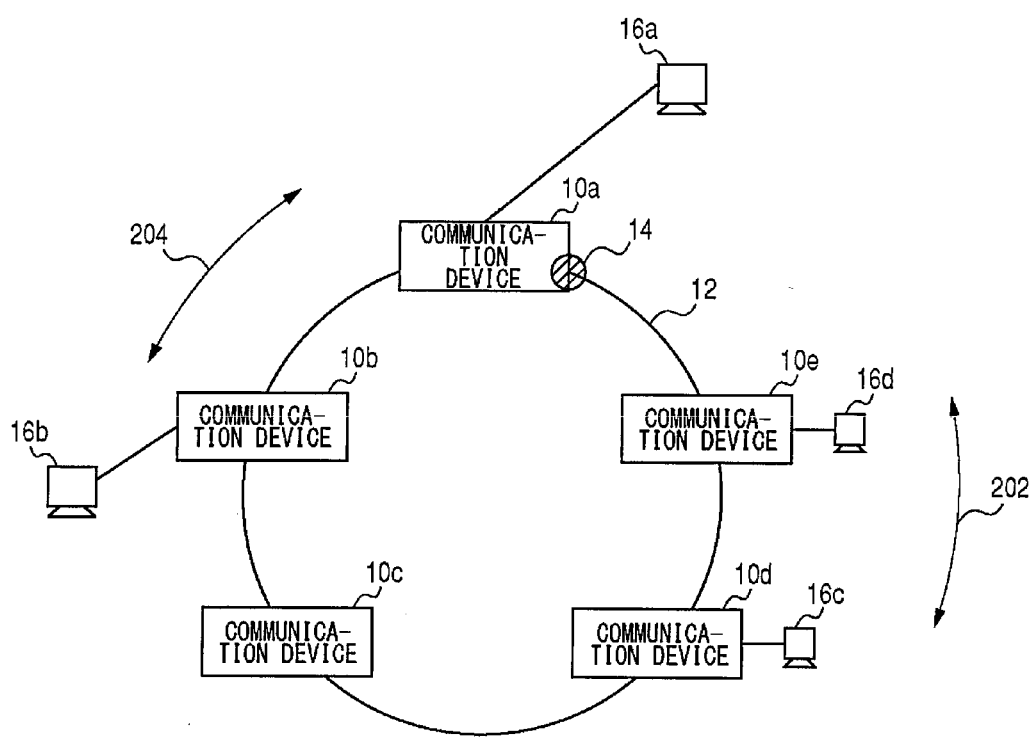
FIG. 2 schematically shows transmission of user data in a ring network.

A summary of the present invention will be given before describing the embodiment of the present invention. FIGS. 1 and 2 schematically show transmission of user data (also referred to as "user frame" or "main signal") in a ring network. As shown in FIG. 1, a block point 14 is provided in one (the communication device 10a in FIG. 1) of a plurality of communication devices (communication devices 10a-10e) that support the ring protocol and that form a ring network 12, for the purpose of preventing a loop of data frames. In the ring network 12, signals are transmitted in a route that bypasses the block point 14. When a failure occurs in a segment, the block point 14 in the communication device 10a is opened so that a channel is maintained in a route that bypasses the segment in failure.

Referring to FIG. 1, user data (at a communication speed of 200 Mbps) exchanged between user devices 16a and 16b is transmitted on a route 200. User data (at a communication speed of 100 Mbps) exchanged between user devices 16c and 16d is transmitted on a route 202. User devices are devices installed in user networks and may be the user's PC terminals. The user data exchanged between the user device 16a and 10b is transmitted via a large number of communication devices. Disadvantages from this include large transmission delay and much bandwidth consumed in the ring network 12.

By establishing block point 14 of the communication device 10a in a ring connection port opposite to the location of FIG. 1, i.e., by establishing it in the ring connection port facing the communication device 10e, the user data at a communication speed of 200 Mbps exchanged between the user devices 16a and 16b is transmitted on a route 204. In other words, the user data is transmitted in the optimal and shortest route without using resources for bypassing the signal.

However, the flow rate of user data flowing in the ring network varies depending on the time zone (day/night) or day of the week (weekday/holiday). It has therefore been not easy to optimize the route of transmission of user data in a ring network, i.e., to locate a block point at the optimal position in a ring network.

This is addressed by the communication system according to the embodiment by measuring objective data for facilitating establishment of a block point at the optimal location in a ring network, and, more specifically, measuring the flow rate of user data in the ring network, and by providing the data to the operation personnel of the ring network. Further, the system according to the embodiment estimates the optimal position of the block point according to the flow rate of user data in the ring network.

Figure 3:
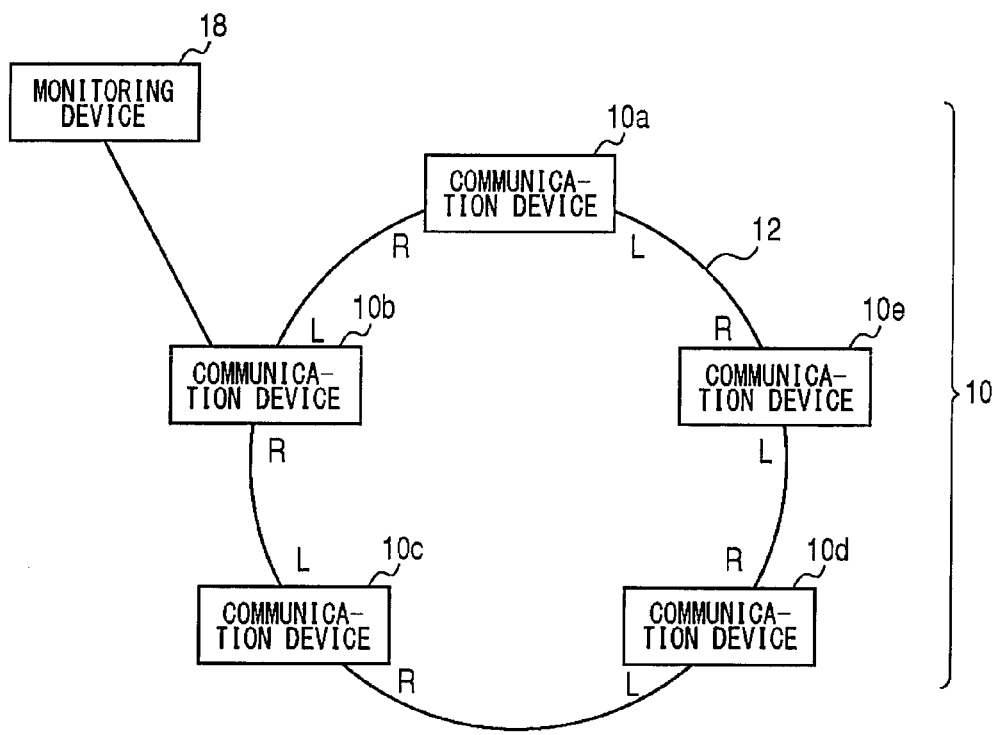
FIG. 3 shows the configuration of the communication system according to the embodiment.

FIG. 3 shows the configuration of the communication system according to the embodiment. A communication system 100 comprises a communication device 10a, a communication device 10b, a communication device 10c, a communication device 10d, a communication device 10e, which are generically referred to as communication devices 10, and a monitoring device 18. Each of the communication devices 10 is a Layer 2 switch. The communication devices are mutually connected in a ring topology via a communication cable so as to form the ring network 12. The ring network 12 according to the embodiment is exemplified by a Layer 2 communication network for transmitting MAC frames as user data. The ring network 12 may be a communication network of other types. For example, the ring network 12 may be a Layer 3 communication network. In this case, the communication device 10 may be a Layer 3 switch for routing IP packets.

The communication device 10 relays MAC frames that should be transmitted in the ring network 12. The communication device also relays a MAC frame that should be transmitted from the ring network 12 to a network outside the ring network 12 (hereinafter, referred to as an "external network") and relays a MAC frame that should be transmitted from the external network to the ring network 12.

Referring to FIG. 3, "L" and "R" are labels attached for convenience to distinguish between communication ports connected to the ring network 12. Hereinafter, the side that transmits a MAC frame clockwise in the figure and receives a MAC frame counter clockwise will be labeled as the "L" side, and the side that transmits a MAC frame counter clockwise in the figure and receives a MAC frame clockwise will be labeled as the "R" side.

A monitoring device 18 is an information processing device for monitoring the flow rate of user data in the ring network. According to the embodiment, the monitoring device 18 is assumed to be provided outside the communication device 10. Alternatively, the monitoring device 18 may be provided in one of the communication devices 10.

Figure 4:
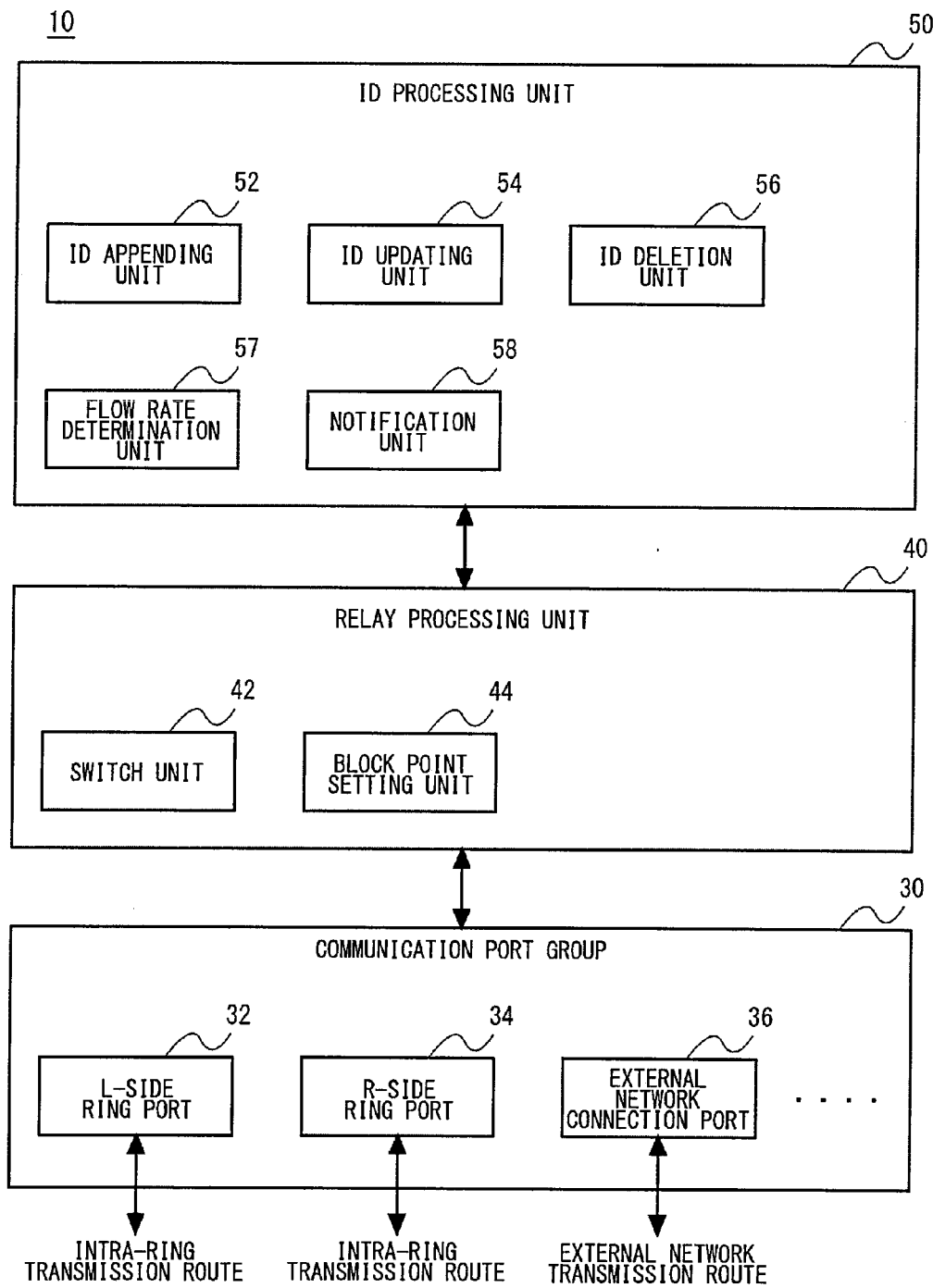
FIG. 4 is a functional block diagram of the communication device of FIG. 3.

FIG. 4 is a functional block diagram of the communication device 10 of FIG. 3. The communication device 10 comprises a communication port group 30, a relay processing unit 40, and an ID processing unit 50. The blocks depicted in the block diagrams of FIG. 4 and other figures of this specification are implemented in hardware such as devices or mechanical components such as a CPU of a computer, and in software such as a computer program etc. FIG. 4 depicts functional blocks implemented by the cooperation of these elements. Therefore, it will be obvious to those skilled in the art that the functional blocks may be implemented in a variety of manners by a combination of hardware and software.

The communication port group 30 includes an L-side ring port 32, an R-side ring port, and an external network connection port 36. The L-side ring port 32 is a communication port connected to the transmission route of the ring network 12 at the L side of the communication device 10, and the R-side ring port is a communication port connected to the transmission route of the ring network 12 at the R side of the communication device 10. The L-side ring port 32 and the R-side ring port 34 do not receive or transmit a MAC frame when a block point is established in the port. The external network connection port 36 is a communication port connected to a transmission route of the external network.

The relay processing unit 40 includes a switch unit 42 and a block point setting unit 44. The block point setting unit 44 establishes a block point in the L-side ring port 32 or the R-side ring port 34 in accordance with an instruction received from the monitoring device 18. The instruction is exemplified by a data frame that complies with the ring protocol, or a MAC frame designating that a block point be established in a particular communication port.

The switch unit 42 refers to the MAC address of a MAC frame received in the communication port group 30 and determines a communication port that should send the MAC frame. The switch unit 42 delivers the MAC frame to the communication port thus determined, causing the frame to be sent to the transmission route. The switch unit 42 does not send the MAC frame from the communication port in which a block point is established.

The ID processing unit 50 includes an ID appending unit 52, an ID updating unit 54, and ID deletion unit 56, an flow rate determination unit 57, and a notification unit 58. The ID appending unit 52 appends to the MAC frame a tag containing a "passage ID" indicating the number of communication devices 10 in the ring network 12 that relayed the MAC frame received by the external network connection port 36 and flowing from the external connection network into the ring network 12. It can be said that the passage ID indicates the number of communication devices 10 in the ring network 12 that the MAC frame traveled through or indicates the hop count of the MAC frame in the ring network 12. The tag that contains the passage ID will be referred to as an "ID tag". The ID appending unit 52 appends an ID tag containing a passage ID=1, an initial value of a passage ID, to the MAC frame.

The ID updating unit 54 updates the ID tag of a MAC frame received by the L-side ring port 32 and send from the R-side ring port 34 or a MAC frame received by the R-side ring port 34 and sent from the L-side ring port 32, i.e., updates the ID tag of a MAC frame relayed in the ring network 12. More specifically, the ID updating unit 54 increments the passage ID stored in the ID tag.

The ID deletion unit 56 removes the ID tag appended to a MAC frame received by the L-side ring port 32 or the R-side ring port 34 and sent from the external connection port connection port 36. Such a MAC frame can be said to be an outbound MAC frame sent from the ring network 12 to the external network and to be a MAC frame for which the switch unit 42 determines the external network connection port 36 as an output port. This ensures that an ID tag is appended only to MAC frames transmitted within the ring network 12 and can prevent the tag from affecting user devices outside the ring network 12.

The flow rate determination unit 57 refers to a MAC frame received by the L-side ring port 32 or the R-side ring port 34 and sent from the external network connection port 36 and identifies the passage ID contained in the ID tag appended to the MAC frame and the amount of data for the MAC frame. This MAC frame can also be said to be an outbound MAC frame sent from the ring network 12 to the external network and to be a MAC for which the switch unit 42 determines the external network connection port 36 as an output port.

The flow rate determination unit 57 defines "received frame information", which maps information indicating the reception port of a MAC frame (i.e., information indicating "L side" or "R side"), the passage ID of the MAC frame, and the amount of data for the MAC frame to each other. The flow rate determination unit 57 may successively store the received frame information of MAC frames received over a certain period of time (e.g., one minute) in the past, in a predetermined storage area.

The notification unit 58 acknowledges a request for acquisition of information from the monitoring device 18 and communicates the received frame information identified by the flow rate determination unit 57 to the monitoring device 18 along with the identification information identifying the host device. For example, the notification unit 58 may communicate the received frame information on MAC frames received over a predetermined period of time in the past (e.g., one minute) since the acknowledgement of the request for acquisition of information.

Figure 5:
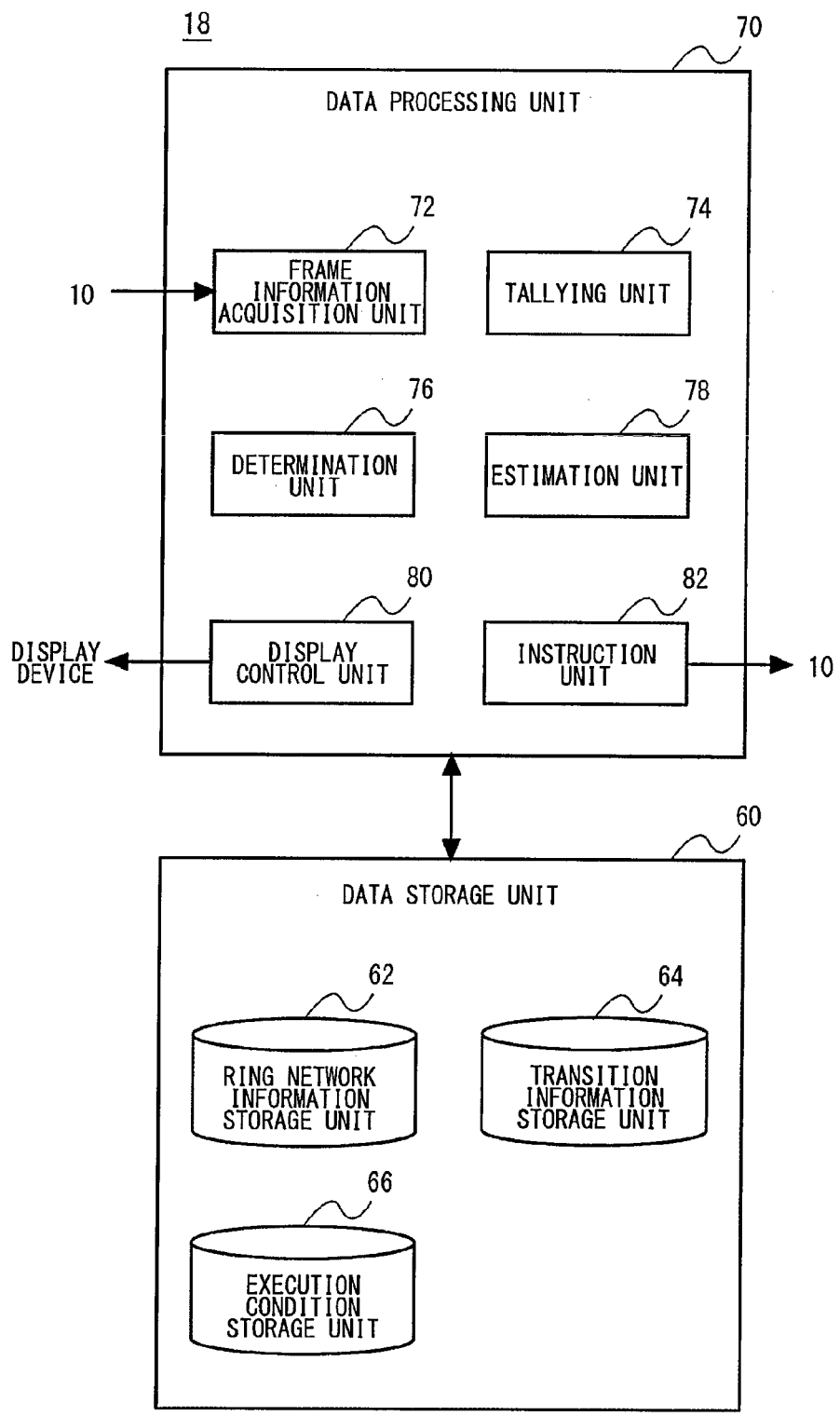
FIG. 5 is a functional block diagram of the monitoring device of FIG. 3.

FIG. 5 is a functional block diagram of the monitoring device of FIG. 3. The monitoring device 18 comprises a data storage unit 60 and a data processing unit 70. The data storage unit 60 is a storage area for storing data and includes a ring network information storage unit 62, a transition information storage unit 64, and an execution condition storage unit 66.

The ring network information storage unit 62 stores information related to the configuration of the ring network 12. More specifically, the ring network information storage unit 62 stores information indicating the arrangement of the communication devices 10a-10e forming the ring network 12. For example, the ring network information storage unit 62 stores information indicating that the communication device 10b is located at the R side of the communication device 10a and the communication device 10e is located at the L side of the communication device 10a. Further, the ring network information storage unit 62 stores information indicating the current position of a block point in the ring network 12. For example, the ring network information storage unit 62 stores information indicating that a block point is established at the R side of the communication device 10a.

The transition information storage unit 64 stores correspondence between the transmission route of data frames before the position of the block point in the ring network 12 is changed and the post-change transmission route of data frames. More specifically, the transition information storage unit 64 maps a combination of the initial direction of transmission and passage ID of a MAC frame to a combination of the direction and the passage ID occurring after a transition. Specific examples of data stored by the transition information storage unit 64 will be described later.

The execution condition storage unit 66 stores an execution condition for determination by a determination unit 76 described later and estimation by an estimation unit 78 described later. The execution condition may be a combination of a particular day of the week and time. For example, the execution condition may define an execution timing such as 9:00 on a week day, 15:00 on a week day, 12:00 on a holiday, and 19:00 on a holiday. The execution condition may be information indicating the flow rate of MAC frames in the communication device 10. For example, the execution condition may be information that defines a threshold value (e.g., 1 Gbps) of the amount of data for frames received by a particular communication port. The execution condition may be defined or changed at will by the operation personnel of the ring network 12.

The data processing unit 70 monitors the status of transmission of frames in the ring network 12 and manages the operation of the ring network 12. More specifically, the data processing unit 70 performs (1) "an intra-device block point optimal position determination process" whereby the optimal position of a block point in the communication device 10, in which a block point is established, is determined, and (2) "a ring network block point optimal position estimation process" whereby the optimal position of a block point in the ring network 12 as a whole is estimated.

The data processing unit 70 includes a frame information acquisition unit 72, a tallying unit 74, a determination unit 76, an estimation unit 78, a display control unit 80, and an instruction unit 82.

A description will first be given of the configuration for executing the intra-device block point optimal position determination process. Upon receipt, from an operation personnel, of an instruction to execute an intra-device block point optimal position determination process designating a particular communication device 10 (hereinafter, also referred to as a "designated device") in which a block point is defined, the instruction unit 82 directs the designated device to provide received frame information. The frame information acquisition unit 72 acquires one or more items of received frame information communicated from the designated device.

The tallying unit 74 refers to the one or more items of received frame information acquired by the frame information acquisition unit 72 and tallies the amount of data for MAC frames for each passage ID, i.e., for each number (i.e., count) of communication devices 10 relaying the MAC frames (hereinafter, "number of relaying devices").

The determination unit 76 refers to the result of tallying by the tallying unit 74 and determines whether the block point is established in the optimal communication port in the designated device. More specifically, if the tallied amount of data for MAC frames relayed by a relatively larger number of devices is smaller than the tallied amount of data for MAC frames relayed by a relatively smaller number of devices, the determination unit 76 determines that the block point is currently located at the optimal position in the designated device. Meanwhile, if the tallied amount of data for MAC frames relayed by a relatively larger number of devices is larger than the tallied amount of data for MAC frames relayed by a relatively smaller number of devices, the determination unit 76 determines that the block point is not currently located at the optimal position in the designated device.

The display control unit 80 causes the result of tallying by the tallying unit 74 and the result of determination by the determination unit 76 to be displayed on a predetermined display device. This helps the operation personnel establish a block point at a proper position in the designated device.

For example, the operational personnel may enter an instruction in the monitoring device 18 to request relocating the block point to the ring port in the designated device opposite to the current port. The instruction unit 82 of the monitoring device 18 may change the position of the block point in the designated device by transmitting, to the designated device, an instruction to open the current block point and an instruction to establish a block point in the ring connection port opposite to the current port. If the determination unit 76 determines that the block point is not currently located at the optimal position in the designated device, the instruction unit 82 may autonomously transmit an instruction to open the block point and an instruction to establish a block point.

A description will now be given of the configuration to execute a ring network block point optimal position estimation process. Upon receipt of an instruction to execute a ring network block point optimal position estimation process from the operation personnel, the instruction unit 82 directs the communication devices 10*a*-10*e* to provide received frame information. The frame information acquisition unit 72 acquires one or more items of received frame information from the communication devices 10*a*-10*e*.

The tallying unit 74 refers to the one or more items of received frame information acquired by the frame information acquisition unit 72 to tally the amount of data for MAC frames for each communication device 10, for each reception port, and for each passage ID.

The estimation unit 78 refers to the result of tallying by the tallying unit 74 to estimate the optimal position of a block point in the ring network 12. More specifically, the estimation unit 78 estimates the tallied amount for each number of relaying devices, occurring when the block point is relocated to a position different from the current position, and estimates the total flow rate in the ring network 12 accordingly. In other words, the estimation unit 78 simulates transition of tallied amount for each number of relaying devices, occurring when the block point is relocated to every possible position in the ring network 12, and estimates the total flow rate in the ring network 12 accordingly.

The estimation unit 78 defines the position of the block point in which the tallied amount of frames relayed by a relatively larger number of devices is the smallest possible amount, as the estimated optimal position of the block point. In other words, the estimation unit 78 defines the position of the block point in which the total flow rate in the ring network 12 is the smallest as the optimal position of the block point.

The display control unit 80 causes the result of tallying by the tallying unit 74 and the result of estimation by the estimation unit 78 to be displayed on a predetermined display device. This helps the operation personnel establish a block point at a proper position in the designated device.

For example, the operational personnel may enter an instruction in the monitoring device 18 to request relocating the block point to the device designated as being the optimal location of the block point. The instruction unit 82 of the monitoring device 18 may transmit, to the communication device 10 in which a block point is currently established, an instruction to open the block point, and transmit an instruction to establish a block point to the communication device 10 in which a new block point should be established. If the determination unit 76 defines a position different from the current position as being the optimal position for the block point, the instruction unit 82 may autonomously transmit an instruction to open the block point and an instruction to establish a block point.

Figure 6:
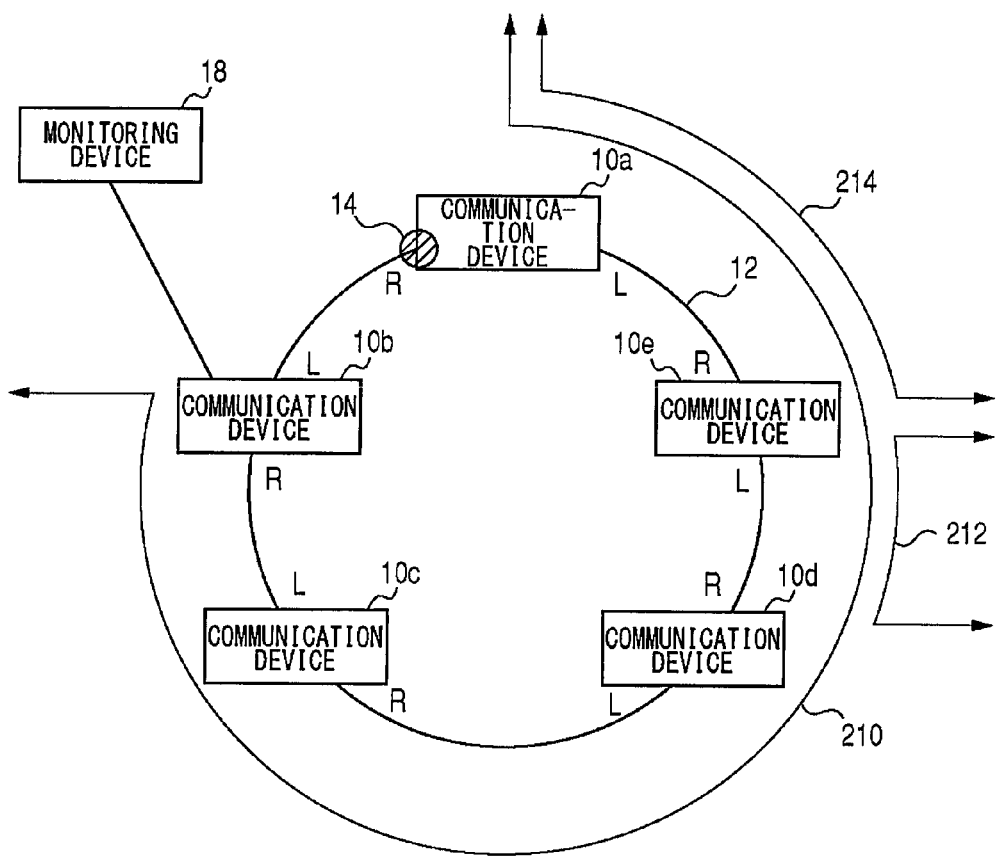
FIG. 6 schematically shows transmission of frames in the ring network.

A description will now be given of the operation of the communication system 100 according to the configuration. A description will first be given of the operation related to the intra-device block point optimal position determination process. FIG. 6 schematically shows transmission of frames in the ring network 12. In the model case of FIG. 6, (1) A block point 14 is established in the communication device 10*a* (i.e., at the R side of the communication device 10*a*) so as to be located between the communication devices 10*a* and 10*b*.

(2) User devices connected to the communication device 10*a* and user devices connected to the communication device 10*b* communicate at 300 Mbps via a route 210.

(3) User devices connected to the communication device 10*d* and user devices connected to the communication device 10*e* communicate at 200 Mbps via a route 212.

(4) User devices connected to the communication device 10*a* and user devices connected to the communication device 10*e* communicate at 100 Mbps via a route 214.

(5) For brevity, it is assumed that the communication rates are identical in both directions of communication between user devices.

In the model of FIG. 6, the flow rate between the communication devices 10*b* and 10*c* is 300 Mbps, the flow rate between the communication devices 10*c* and 10*d* is 300 Mbps, the flow rate between the communication devices 10*d*-10*e* is 500 Mbps, and the flow rate between the communication devices 10*e* and 10*a* is 400 Mbps. Therefore, the total flow rate in the ring network 12 is 1500 Mbps per direction.

Figure 7:
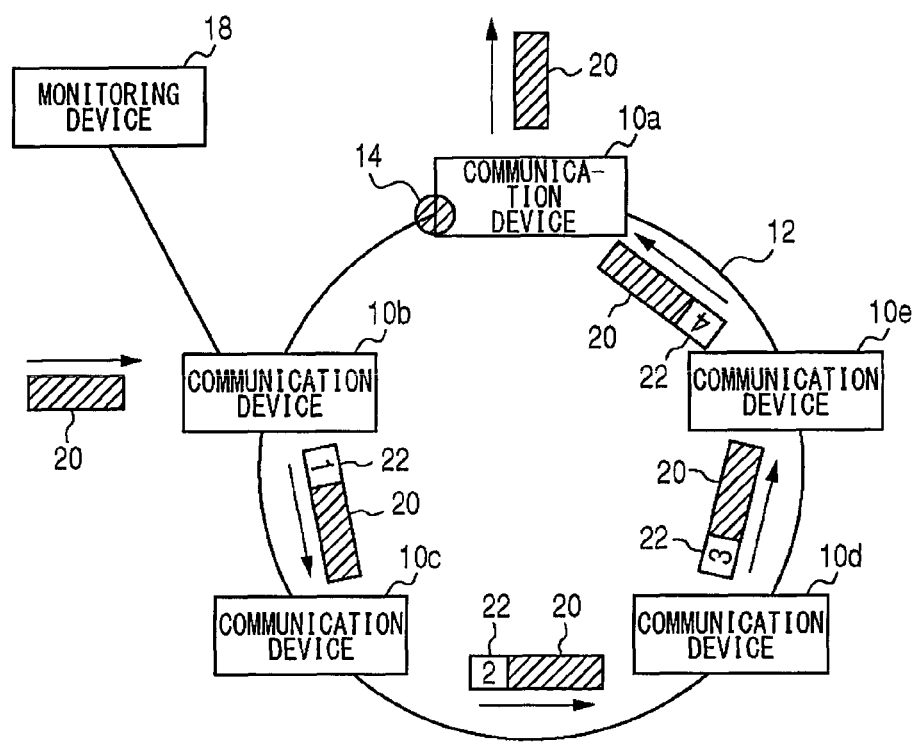
FIG. 7 schematically shows how ID tags are set in MAC frames.

FIG. 7 schematically shows how ID tags are set in MAC frames. The figure shows communication between a user device connected to the communication device 10*a* and a user device connected to the communication device 10*b* via the route 210. In the example of FIG. 7, the external network connection port 36 of the communication device 10*b* receives a MAC frame 20 sent from a user device connected to the communication device 10*b*. The ID appending unit 52 of the communication device 10*b* newly appends an ID tag 22 containing a passage ID=1 to the MAC frame 20, and the communication device 10*b* sends out the MAC frame 20 from the R-side ring port 34. The ID updating unit 54 of the communication device 10*c* increments the passage ID stored in the ID tag 22 (passage ID=2). Similarly, the communication devices 10*d* and 10*e* successively increment the passage ID stored in the ID tag 22 when the device relays the MAC frame 20.

When the L-side ring port 32 of the communication device 10*a* receives the MAC frame 20, the flow rate determination unit 57 of the communication device 10*a* sets received frame information by referring to the received MAC frame 20 and stores the information. The ID deletion unit 56 of the communication device 10*a* removes the ID tag 22 appended to the MAC frame 20, and the communication device 10*a* sends the MAC frame 20 to the user device via the external network connection port 36. Similar steps are performed in the case of communication between a user device connected to the communication device 10*d* and a user device connected to the communication device 10*e* via the route 212, and communication between a user device connected to the communication device 10*a* and a user device connected to the communication device 10*e* via a route 214.

Upon receipt of an execution instruction from the operation personnel or when the execution condition stored by the execution condition storage unit 66 is met, the monitoring device 18 starts the intra-device block point optimal position determination process. The instruction unit 82 of the monitoring device 18 transmits a request for acquisition of information to the communication device 10*a* in which the block point is established. The notification unit 58 of the communication device 10*a* transmits the received frame information stored in the host device to the monitoring device 18. The frame information acquisition unit 72 of the monitoring device 18 receives the received frame information transmitted from the communication device 10*a*.

Figure 8:
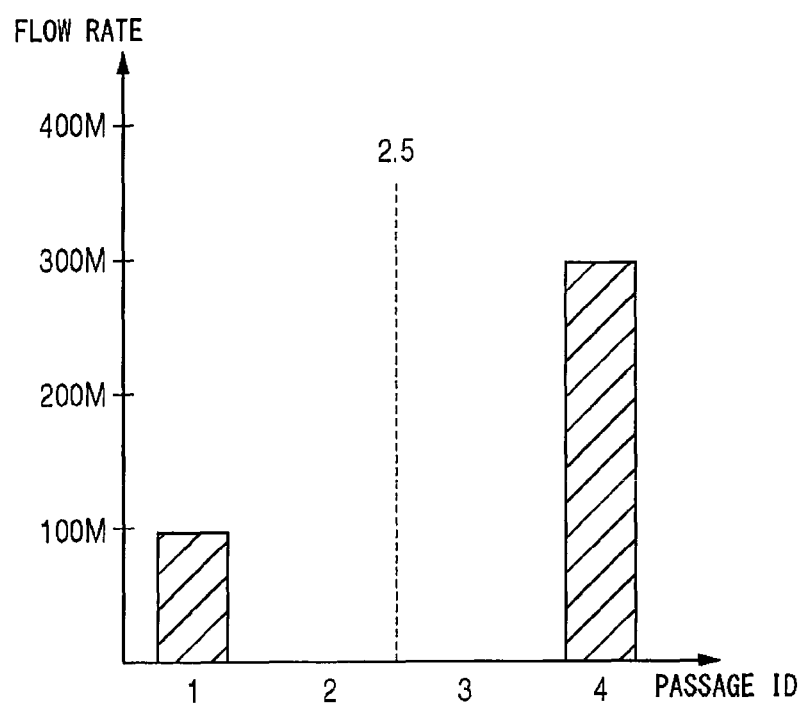
FIG. 8 shows the result of tallying by the tallying unit.

The tallying unit 74 of the monitoring device 18 tallies the amount of data for MAC frames received by the communication device 10*a* for each passage ID, in accordance with the received frame information acquired by the frame information acquisition unit 72. FIG. 8 shows the result of tallying by the tallying unit 74. The figure shows the flow rate of MAC frames received by the communication device 10*a* of FIG. 6.

The determination unit 76 of the monitoring device 18 determines whether the communication route in the ring network 12 will be the optimal route by shifting the block point 14 in the communication device 10*a* from the side toward the communication device 10*b* (R side) to the side toward the communication device 10*e* (L side). The determination unit 76 first determines a determination criteria value. The determination criteria value is given by N/2, where N denotes the number of devices forming the ring network 12. In other words, the determination criteria value will be 5/2=2.5 in the model of FIG. 6.

If the total of flow rate mapped to the passage ID (i.e., the number of relaying devices) larger than the determination criteria value is larger than the total of the flow rate mapped to the passage ID equal to or smaller than the determination criteria value, the determination unit 76 determines that the optimal position of the block point is located in the other ring port instead of the current ring port. In other words, the determination unit 76 determines that the communication route in the ring network 12 will be the optimal route by shifting the block point from the current ring port to the other ring port.

Meanwhile, If the total of flow rate mapped to the passage ID (i.e., the number of relaying devices) larger than the determination criteria value is smaller than the total of the flow rate mapped to the passage ID equal to or smaller (i.e., lower) than the determination criteria value, the determination unit 76 determines that the optimal position of the block point is located at the current ring port. In other words, the determination unit 76 determines that the communication route in the ring network 12 will be the optimal route by maintaining the current position of the block point.

In the example of FIG. 6, the total (400 Mbps) of flow rate mapped to the passage ID larger than the determination criteria value is larger than the total (100 Mbps) of the flow rate mapped to the passage ID equal to or smaller than the determination criteria value so that the determination unit 76 determines that the optimal position of the block point is located in the other ring port instead of the current ring port. The display control unit 80 of the monitoring device 18 causes the result of tallying (e.g., the graph of FIG. 8) by the tallying unit 74 and the result of determination by the determination unit 76 to be displayed on a predetermined display device.

Figure 9:
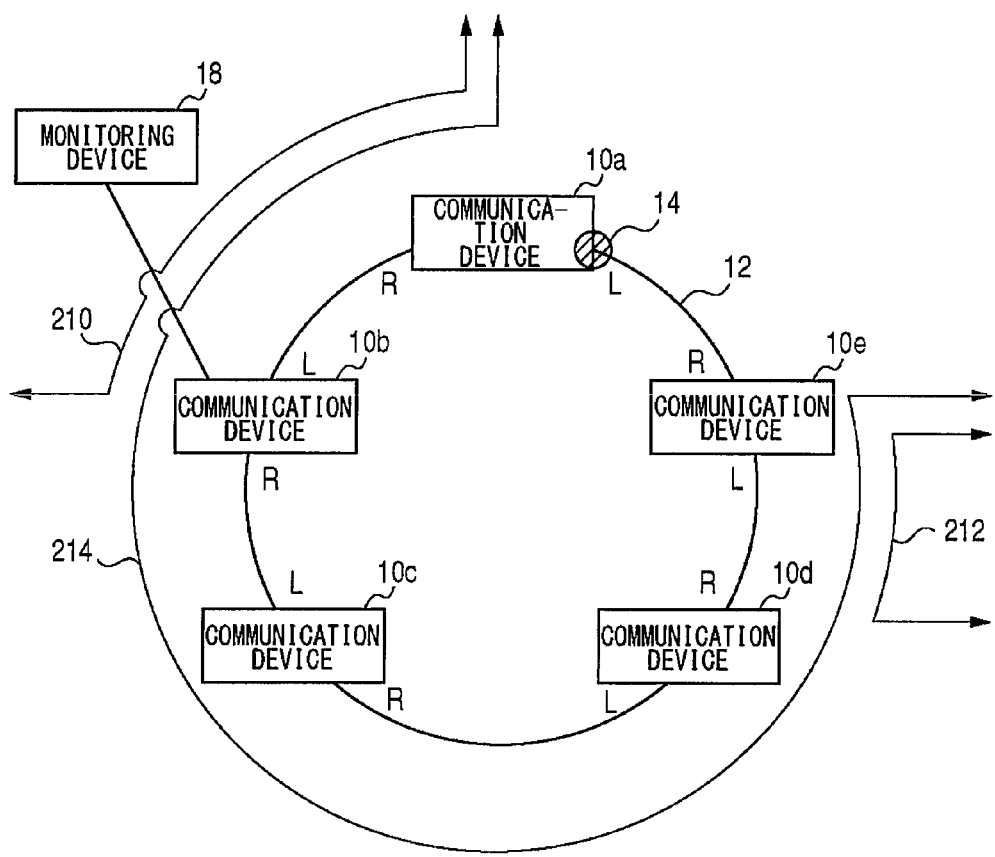
FIG. 9 schematically shows transmission of frames in the ring network.

FIG. 9 schematically shows transmission of frames in the ring network 12. FIG. 9 shows the result of shifting the block point 14 of the communication device 10*a* from the side toward the communication device 10*b* to the side toward the communication device 10*e*. The routes 210-214 of FIG. 6 correspond to the routes 210-214 of FIG. 9. In other words, the route 210 of FIG. 9 represents a communication route of 300 Mbps between a user device connected to the communication device 10*a* and a user device connected to the communication device 10*b*. The route 212 represents a communication route of 200 Mbps between a user device connected to the communication device 10*d* and a user device connected to the communication device 10*e*. The route 214 represents a communication route of 100 Mbps between a user device connected to the communication device 10*a* and a user device connected to the communication device 10*e*.

In FIG. 9, the flow rate between the communication devices 10*a* and 10*b* is 400 Mbps, the flow rate between the communication devices 10*b* and 10*c* is 100 Mbps, the flow rate between the communication devices 10*c* and 10*d* is 100 Mbps, and the flow rate between the communication devices 10*d* and 10*e* is 300 Mbps. Therefore, the total flow rate in the ring network 12 is 900 Mbps per direction, showing an improvement from FIG. 6 (the model in which the block point 14 of the communication device 10*a* is located toward the communication device 10*b*).

Figure 10:
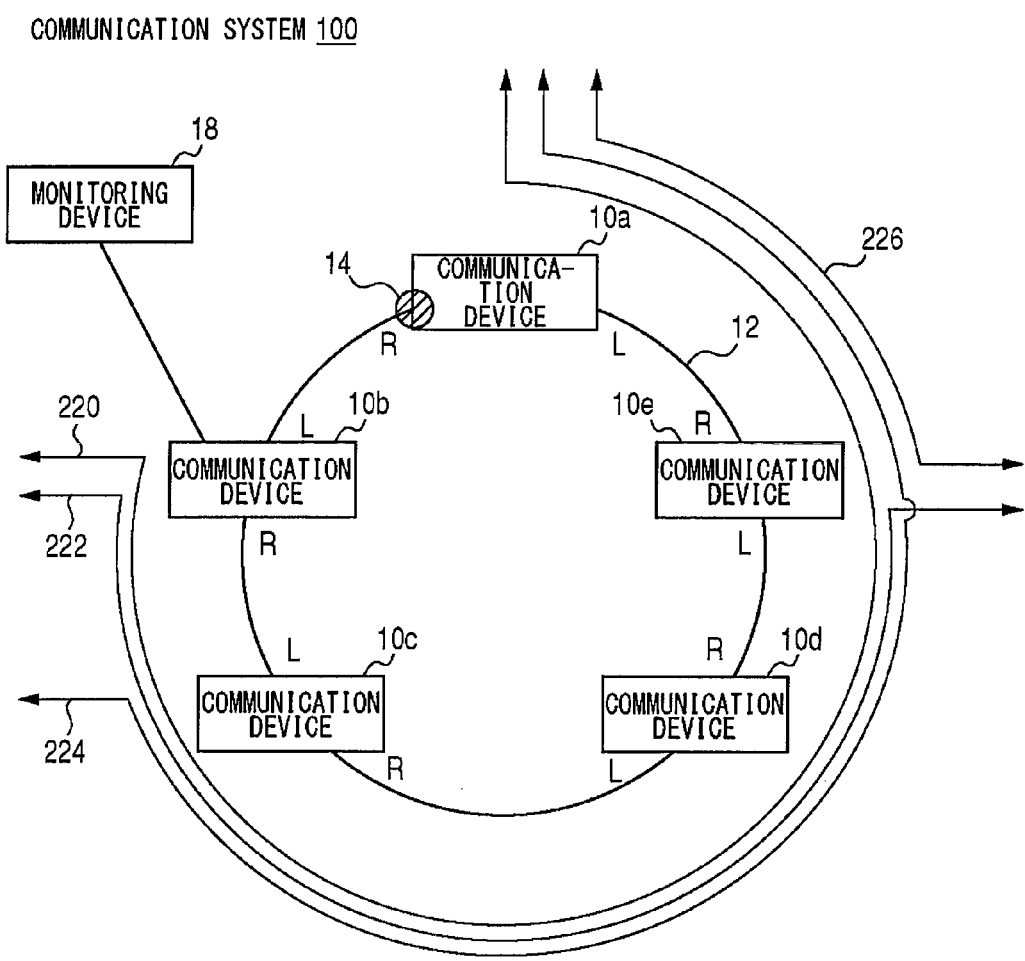
FIG. 10 schematically shows transmission of frames in the ring network.

A description will first be given of the operation related to the ring network block point optimal position determination process. FIG. 10 schematically shows transmission of frames in the ring network 12. In the model case of FIG. 10, (1) A block point 14 is established in the communication device 10*a* (i.e., at the R side of the communication device 10*a*) so as to be located between the communication devices 10*a* and 10*b*.

(2) User devices connected to the communication device 10*a* and user devices connected to the communication device 10*b* communicate at 100 Mbps via a route 220.

(3) User devices connected to the communication device 10*b* and user devices connected to the communication device 10*e* communicate at 200 Mbps via a route 222.

(4) User devices connected to the communication device 10*a* and user devices connected to the communication device 10*c* communicate at 300 Mbps via a route 224.

(5) User devices connected to the communication device 10*a* and user devices connected to the communication device 10*e* communicate at 50 Mbps via a route 226.

In the model of FIG. 10, the flow rate between the communication devices 10*b* and 10*c* is 300 Mbps, the flow rate between the communication devices 10*c* and 10*d* is 600 Mbps, the flow rate between the communication devices 10*d*-10*e* is 600 Mbps, and the flow rate between the communication devices 10*e* and 10*a* is 450 Mbps. Therefore, the total flow rate in the ring network 12 is 1950 Mbps per direction. Communication should essentially be bidirectional so that the flow rate will be different depending on the direction. For brevity, however, it will be assumed in this model case that flow rates are identical in both directions. The total flow rate in the ring network inclusive of both directions will therefore be assumed to be 1950×2=3900 Mbps. It should be noted that the present invention can address the case of different flow rates in different directions, by using the same algorithm.

As mentioned already, the communication devices 10a-10e successively increment the passage ID in the ID tag as the devices relay a MAC frame in the ring network 12 and store received frame information.

Upon receipt of an execution instruction from the operation personnel or when the execution condition stored by the execution condition storage unit 66 is met, the monitoring device 18 starts the ring network block point optimal position estimation process. The instruction unit 82 of the monitoring device 18 transmits a request for acquisition of information to each of the communication devices 10a-10e. The notification unit 58 of each communication device 10 transmits the received frame information stored in the host device to the monitoring device 18. The frame information acquisition unit 72 of the monitoring device 18 receives the received frame information transmitted from each communication device 10.

The tallying unit 74 of the monitoring device 18 refers to the received frame information acquired by the frame information acquisition unit 72 to tally the amount of data for MAC frames for each communication device 10, for each reception port, and for each passage ID. FIG. 11 shows the result of tallying by the tallying unit 74. The figure shows the flow rate of MAC frames received by the L-side ring port 32 (denoted by L in the figure) and the R-side ring port (denoted by R in the figure) of the communication devices 10a-10e and outgoing from the ring network 12 to an external network. The entry of "B" in the block point column of the figure indicates the current position of the block point.

The total flow rate in the ring network 12 is given by determining (sum of flow rate×passage ID value) for each passage ID and adding up the values. In the case of FIG. 11, the total flow rate will be
(50+50)×1+0×2+(300+200+300+200)×3+(100+100)×4=
3900 Mbps.

The estimation unit 78 of the monitoring device 18 successively estimates the total flow rate in the ring network 12 occurring when the block point 14 in the ring network 12 is shifted to a position different from the current position. The estimation unit 78 defines the position of the block point in which the total flow rate in the ring network 12 is the smallest, i.e., the position of the block point 14 in which the amount of data mapped to a relatively large passage ID is the smallest possible amount, as the optimal position of the block point 14.

The steps of flow rate estimation by the estimation unit 78 will be described below.

(step 1) A temporary destination of the block is determined as shown in FIG. 12. In the figure, the location between the communication devices 10b and 10c is determined as a temporary destination.

(step 2) The distance between the block point B (old) at the source of transition and the block point B (new) at the destination of transition (hereinafter, also referred to as "new-old point distance") is calculated. The new-old point distance indicates the number of segments formed by pairs of communication devices. In the example of FIG. 12, there are three segments, i.e., a segment between the communication devices 10c and 10d, a segment between the communication devices 10d and 10e, and a segment between the communication devices 10e and 10a so that the new-old point distance will be 3.

(step 3) The locations in which there will be no change in the flow rate as a result of the transition of the block point (hereinafter "locations of change") are identified in accordance with the new-old point distance. In other words, the location in which the transmission route of MAC frames does not change is identified. More specifically, the new-old point distance is decremented clockwise (L direction), starting from the block point at the source of transition and the block point at the destination of transition. And the new-old point distance is decremented counterclockwise (R direction), starting from the block point at the source of transition and the block point at the destination of transition. The locations with the passage ID corresponding to (i.e., equal to or less than) the new-old point distance are identified as locations of no change.

In the example of FIG. 12, the new-old point distance is 3. Therefore, entries in the R side of the communication device 10c with the ID=3, the R side of the communication device 10d with the ID=2, and the R side of the communication device 10e with the ID=1, which are encountered in the counterclockwise (R direction) travel from the block point B (new) at the destination of transition, are identified as requiring no change because their IDs are equal to or less than the new-old point distance. Similarly, entries in the L side of the communication device 10a with the ID=3, the L side of the communication device 10e with the ID=2, and the L side of the communication device 10d with the ID=1, which are encountered in the clockwise (L direction) travel from the block point B (old) at the source of transition, are identified as locations of no change because their IDs are equal to or less than the new-old point distance. FIG. 12 shows locations of no change as shaded areas. In the example of FIG. 12, the block point B (old) at the source of transition and the block point (new) at the destination of transition are adjacent to each other. Therefore, there are no locations of no change in the counterclockwise travel (R direction) from the block point B (old) at the source of transition and the clockwise travel (L direction) from the block point B (new) at the destination of travel.

The algorithm for identifying locations of no change can also be explained as follows. The estimation unit 78 refers to the configuration information of the ring network 12 stored by the ring network information storage unit 62. The estimation unit 78 determines that the flow rate at the R-side ring port 34 of the communication device 10c remains unchanged, namely, determines that the transmission route of MAC frames (ID=3) received by the communication device 10a, the location of the block point B (old) at the source of transition, from the external network is not affected by the transition of the block point, and identifies the locations with the ID=3 or less as locations of no change. Further, the estimation unit 78 determines that the flow rate at the R-side ring port 34 in the communication device 10d remains unchanged, namely, determines that the transmission route of MAC frames (ID=2) received by the communication device 10a from the external network is not affected by the transition of the block point, and identifies the locations with the ID=2 or less as locations of no change.

Similarly, the estimation unit 78 determines that the flow rate at the L-side ring port 32 in the communication device 10a remains unchanged, namely, determines that the transmission route of MAC frames (ID=3) received by the communication device 10c, the location of the block point B (new) at the destination of transition, from the external network is not affected by the transition of the block point, and identifies the locations with the ID=3 or less as locations of no change. Further, the estimation unit 78 determines that the flow rate at the L-side ring port 32 in the communication device 10e remains unchanged, namely, determines that the transmission route of MAC frames (ID=2) received by the communication device 10c from the external network is not affected by the transition of the block point, and identifies the locations with the ID=2 or less as locations of no change.

(step 4) The bandwidth at the location in the transmission route of MAC frames affected by the transition of the block point is transferred to the location opposite in the direction of transmission in the same communication device where the passage ID is of a symmetrical value. The location where the passage ID is of a symmetrical value is defined as the location of symmetry that results when the average value of the passage IDs is defined as an axis of symmetry. In the example of FIG. 12, the entry of bandwidth for ID=4 for the L side of the communication device 10a is transferred within the table to replace the entry of bandwidth for ID=1 for the R-side of the communication device 10a. In other words, the bandwidth consumed by devices, the number of which is defined by the passage ID=4, before reaching the L side of the communication device 10a is redefined as the bandwidth consumed by devices with the passage ID=1 before reaching the R side of the communication device 10a. Further, the entry of bandwidth for ID=3 for the R side of the communication device 10b is transferred within the table to replace the entry of bandwidth for ID=2 for the L-side of the communication device 10b. In other words, he bandwidth consumed by devices (passage ID=3) before reaching the R side of the communication device 10b is newly defined as the bandwidth consumed by devices (passage ID=2) before reaching the L side of the communication device 10b.

The estimation unit 78 according to the embodiment transfers (i.e., transcribes) the flow rate at the locations other than the locations of no change, i.e., the locations in the transmission route of MAC frames affected by the transition of the block point, to different locations in accordance with the mapping stored by the transition information storage unit 64. FIG. 13 shows the mapping stored by the transition information storage unit 64. It is assumed in this embodiment that the bandwidth transition algorithm is defined in a table. Alternatively, the algorithm may be directly implemented in a program code.

FIG. 14 shows the result of estimation by the estimation unit 78. The figure shows the result of transferring the flow rate at the locations in the transmission route of MAC frames affected by the transition of the block point to different locations in accordance with the mapping stored by the transition information storage unit 64. More specifically, the figure shows the flow rate in each communication devices 10 occurring when the block point is shifted to the location between the communication devices 10b and 10c.

(step 5) The total flow rate in the ring network 12 occurring as a result of shifting the block point is calculated. The total flow rate in the ring network 12 of FIG. 14 is calculated as $(50+100+100+50) \times 1 + (200+200) \times 2 + (300+300) \times 3 + 0 \times 4 = 2900$ Mbps.

Figure 15:
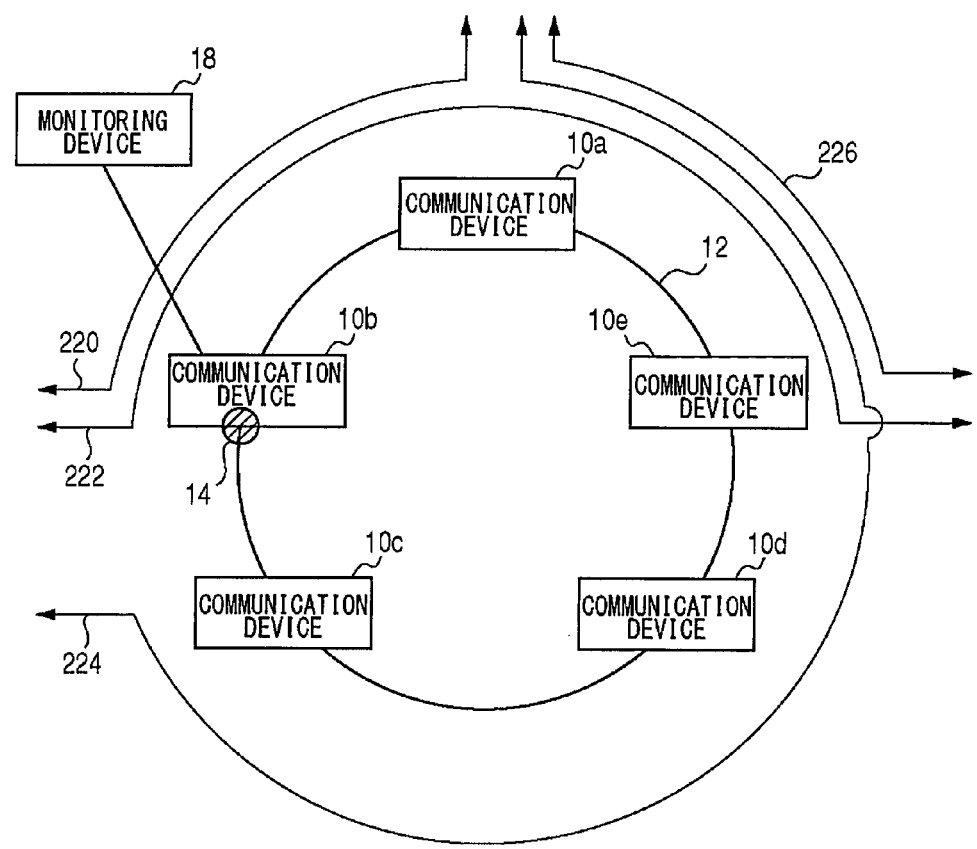
FIG. 15 schematically shows transmission of frames in the ring network.

FIG. 15 schematically shows transmission of frames in the ring network 12. FIG. 15 shows the result of shifting the block point 14 previously established between the communication devices 10a and 10b in FIG. 10 to the location between the communication devices 10b and 10c. The routes 220-226 of FIG. 10 correspond to the routes 220-226 of FIG. 15. In other words, the route 220 of FIG. 15 represents a communication route of 100 Mbps between a user device connected to the communication device 10a and a user device connected to the communication device 10b. The route 222 of FIG. 15 represents a communication route of 200 Mbps between a user device connected to the communication device 10b and a user device connected to the communication device 10e. The route 224 of FIG. 15 represents a communication route of 300 Mbps between a user device connected to the communication device 10a and a user device connected to the communication device 10c. The route 226 of FIG. 15 represents a communication route of 50 Mbps between a user device connected to the communication device 10a and a user device connected to the communication device 10e.

In FIG. 15, the flow rate between the communication devices 10a and 10b is 300 Mbps, the flow rate between the communication devices 10c and 10d is 300 Mbps, the flow rate between the communication devices 10d and 10e is 300 Mbps, and the flow rate between the communication devices 10a and 10e is 550 Mbps. Therefore, the total flow rate in the ring network 12 is $(300+300+300+550) \times 2 = 2900$ Mbps. This shows that the result of simulation by the estimation unit 78 is accurate.

Subsequently, the estimation unit 78 repeats the steps 1-4 and calculates the total flow rate in the ring network 12 occurring when the block point 14 is shifted to the location between the communication devices 10c and 10d.

(step 1) A temporary destination of the block is determined as shown in FIG. 16.

(step 2) The new-old point distance is calculated. In the example of FIG. 16, the block point (old) at the source of transition and the block point (new) at the destination of transition are not adjacent to each other so that the new-old point distances are 2 and 1.

(step 3) The locations of no change are identified in accordance with the new-old point distance.

In the example of FIG. 16, the new-old point distance in the counterclockwise direction (R direction) from the block point (new) at the destination of transition is 2, and the new-old point distance in the clockwise direction (L direction) from the block point (new) at the destination of transition is 1. Therefore, entries in the R side of the communication device 10d with the ID=2 and the R side of the communication device 10e with the ID=1, which are encountered in the counterclockwise (R direction) travel from the block point B (new) at the destination of transition, are identified as locations of no change because their IDs are equal to or less than the new-old point distance. Similarly, entries in the L side of the communication device 10c with the ID=1, which is encountered in the clockwise (L direction) travel from the block point B (new) at the destination of transition, is identified as a location of no change because its ID is less than the new-old point distance.

In the example of FIG. 16, the new-old point distance from the block point B (old) at the source of transition in the clockwise direction (L direction) is 2, and the new-old point distance from the block point B (old) at the source of transition in the counterclockwise direction (R direction) is 1. Therefore, entries in the L side of the communication device 10a with the ID=2 and the L side of the communication device 10e with the ID=1, which are encountered in the clockwise (L direction) travel from the block point B (old) at the source of transition, are identified as locations of no change because their IDs are equal to or less than the new-old point distance. Similarly, entries in the R side of the communication device 10b with the ID=1, which is encountered in the counterclockwise (R direction) travel from the block point B (old) at the source of transition, is identified as a location of no change because its ID is equal to the new-old point distance. FIG. 16 shows locations of no change as shaded areas.

(step 4) The flow rate at the locations other than the locations of no change is transferred to different locations in accordance with the mapping stored by the transition information storage unit 64. FIG. 17 shows the result of estimation by the estimation unit 78. More specifically, the figure shows the flow rate in each communication devices 10 occurring when the block point is shifted to the location between the communication devices 10c and 10d.

(step 5) The total flow rate in the ring network 12 occurring as a result of shifting the block point is calculated. The total flow rate in the ring network 12 of FIG. 17 is calculated as
$(50+100+100+50) \times 1 + (300+200+300+200) \times 2 + 0 \times 3 + 0 \times 4 = 2300$ Mbps.

The estimation unit 78 performs this simulation for all segments in the ring network 12 in which the block point 14 can be established so as to calculate the total flow rate in the ring network 12 occurring when the block point 14 is assumed to be established in the respective segments. In the model case of FIG. 10, the total flow rate in the ring network 12 occurring when the block point is shifted to the location between the communication devices 10d and 10e is 2300 Mbps. Further, the total flow rate in the ring network 12 occurring when the block point is shifted to the location between the communication devices 10a and 10e is 3000 Mbps.

The estimation unit 78 determines the segment with the least total flow in the ring network 12 as the optimal position of the block point. In the model case of FIG. 10, the segment between the communication devices 10c and 10d and the segment between the communication devices 10d and 10e, in which the total flow in the ring network 12 will be 2300 Mbps, are determined as the optimal position of the block point.

The display control unit 80 of the monitoring device 18 causes the result of tallying by the tallying unit (e.g., the table of FIG. 11), the result of simulation by the estimation unit 78 (e.g., the tables of FIGS. 14 and 17), and the result of estimation of the optimal position of the block point to be displayed on a predetermined display device. In the above example, the display control unit 80 may present to the operation personnel that it is most appropriate to establish a block point in the R-side ring port 34 of the communication device 10c, the L-side ring port 32 of the communication device 10d, the R-side ring port 34 of the communication device 10d, or the L-side ring port 32 of the communication device 10e.

Figure 18:
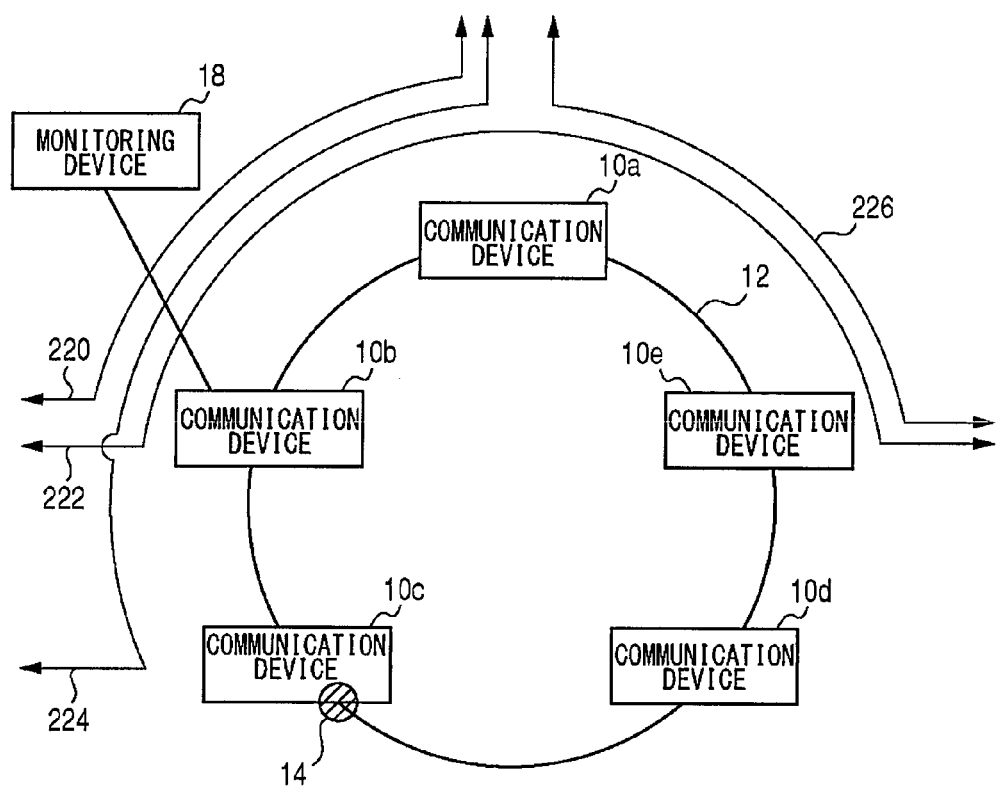
FIG. 18 schematically shows transmission of frames in the ring network.

FIG. 18 schematically shows transmission of frames in the ring network 12. FIG. 18 shows the result of shifting the block point 14 previously established between the communication devices 10a and 10b in FIG. 10 to the location between the communication devices 10c and 10d. The routes 220-226 of FIG. 10 correspond to the routes 220-226 of FIG. 18. In FIG. 18, the transmission route of MAC frames in the ring network 12 is optimized in the ring network 12 as a whole.

According to the communication system 100 of the embodiment, transparent transmission of user data in the ring network 12 is maintained and the amount of data for user frames is tallied for each number of relaying devices. This allows the objective data indicating the status of frame transmission in the ring network 12 to be presented to the operation personnel of the ring network 12. For example, it will be easier for the operation personnel of the ring network 12 to decide to change the position of establishing the block point if a large amount of data is transmitted via a large number of communication devices.

The inventive system also helps the operation personnel to establish a block point at a proper position in the communication device 10 in which a block point in the ring network 12 is being established. Further, the system helps the operation personnel to establish a block point at a proper position in the ring network 12 as a whole. In other words, the inventive system facilitates transmission of user frames via the optimal route in the ring network 12.

The execution condition in the execution condition storage unit 66 can be established at will by the operation personnel. Accordingly, the intra-device block point optimal position determination process and the ring network block point optimal position estimation process for optimizing the frame transmission route in the ring network 12 can be executed as needed, allowing for the time zone and day of the week. This makes it possible to dynamically change the position of establishing a block point in accordance with the status of transmission of frames in the ring network 12, the block point not being fixed at the initial position.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In one variation related to the application of the ID tag, the ID tag may be used to detect a failure. More specifically, the communication device 10 may store the maximum value (hereinafter, referred to as a "loop threshold value") that the passage ID can take in the absence of a loop (in normal operation) in the ring network 12. Typically, the loop threshold value is (the number of communication devices 10 in the ring network 12-1). The communication device 10 may further comprise a loop determination unit configured to determine whether the passage ID of a frame received by the L-side ring port 32 or the R-side ring port 34 exceeds the loop threshold value, and an alert unit configured to alert the monitoring device 18 or the operation personnel of the occurrence of a loop in the ring network 12 when it is determined that the passage ID of a received frame exceeds the loop threshold value.

The configuration of the variation described above may be provided in the monitoring device 18. In other words, the monitoring device 18 may store the loop threshold value and further comprise a loop determination unit configured to monitor the occurrence of a loop in the ring network 12 in accordance with the received frame information of the communication device 10 acquired by the frame information acquisition unit 72, and an alert unit configured to alert the operation personnel of the occurrence of a loop.

It will be understood to a skilled person that the functions achieved by the constituting elements recited in the claims are implemented either alone or in combination by the constituting elements shown in the embodiment and the variation.

What is claimed is:

1. A communication system comprising:
a plurality of communication devices forming a ring network; and
a monitoring device for the ring network for estimating an optimal position of a block point in the ring network,
wherein each of the plurality of communication devices comprises:
a relaying circuit for relaying a frame; and
an identification (ID) processor for appending, to the frame that the communication device relays, an ID indicating the number of communication devices relaying the frame in the ring network,
wherein the monitoring device includes a tallying unit for referring to frames received by a predetermined communication device forming the ring network and having the ID appended thereto, and tallying an amount of data for frames for each number of relaying communication devices.

2. The communication system according to claim 1,
wherein the tallying unit of the monitoring device refers to frames received by a communication device in which the block point is established and to tally an amount of data for frames for each number of relaying communication devices, and wherein the monitoring device further comprises a determination unit for determining, if a tallied amount of frames relayed by a relatively larger number of communication devices is larger than a tallied amount of frames relayed by a relatively smaller number of communication devices, that a current position of the block point in the communication device in which the block point is being established is different from the optimal position.

3. The communication system according to claim 1,
wherein the tallying unit of the monitoring device refers to frames received by the plurality of communication devices and tallies an amount of data for frames, for each communication device and for each number of relaying communication devices,
wherein the monitoring device comprises an estimation unit for estimating, based on a result of tallying by the tallying unit, the optimal position of the block point in the ring network, by estimating a tallied amount for each number of relaying communication devices occurring when the position of the block point is shifted to a position different from a current position.

4. The communication system according to claim 3,
wherein the estimation unit of the monitoring device estimates the optimal position of the block point in the ring network wherein the tallied amount of frames relayed by a relatively larger number of communication devices is the smallest possible amount.

5. The communication system according to claim 3,
wherein the estimation unit of the monitoring device estimates, when a predefined execution condition is met, the optimal position of the block point in the ring network at that time.

6. A monitoring device for a ring network, said monitoring device comprising:
a frame information acquisition unit for acquiring identification (ID) information on an ID that is appended to a frame received by a predetermined one of a plurality of communication devices forming the ring network and that indicates the number of communication devices relaying the frame in the ring network, and acquiring information on an amount of data for the frame; and
a tallying unit for referring to frames received by the predetermined communication device and tallying an amount of data for the frames for each number of relaying communication devices.

7. A flow rate monitoring method for a ring network, said method comprising:
appending, to a frame relayed by a communication device forming the ring network, identification (ID) information indicating the number of communication devices relaying the frame in the ring network; and
referring to frames received by a predetermined communication device in the ring network and having the ID information appended thereto, and tallying an amount of data for the frames for each number of relaying communication devices.

* * * * *